United States Patent
Stoughton et al.

(10) Patent No.: US 9,261,112 B2
(45) Date of Patent: Feb. 16, 2016

(54) DAMPERS FOR FAN SPINNERS OF AIRCRAFT ENGINES

(71) Applicant: General Electric Company, Schenectady, NY (US)

(72) Inventors: Philip Howard Stoughton, Cincinnati, OH (US); Benjamin Allen Dietsch, Dayton, OH (US); Anthony John Durchholz, Loveland, OH (US); Michael Charles Eckert, West Chester, OH (US)

(73) Assignee: General Electric Company, Schenectady, NY (US)

( * ) Notice: Subject to any disclaimer, the term of this patent is extended or adjusted under 35 U.S.C. 154(b) by 789 days.

(21) Appl. No.: 13/688,558

(22) Filed: Nov. 29, 2012

(65) Prior Publication Data

US 2014/0356134 A1 Dec. 4, 2014

Related U.S. Application Data

(60) Provisional application No. 61/637,537, filed on Apr. 24, 2012.

(51) Int. Cl.
*F03B 1/02* (2006.01)
*F04D 29/66* (2006.01)
*F04D 29/32* (2006.01)
*F01D 5/10* (2006.01)

(52) U.S. Cl.
CPC ............ *F04D 29/668* (2013.01); *F04D 29/321* (2013.01); *F04D 29/329* (2013.01); *F01D 5/10* (2013.01); *F05D 2260/96* (2013.01); *Y10T 29/49327* (2015.01)

(58) Field of Classification Search
CPC ... F04D 29/668; F04D 29/329; F04D 29/325; F02C 7/04; B64C 11/14; F01D 5/10; F01D 5/323; F01D 5/326; F05D 2260/96
USPC .............. 416/245 R, 245 A, 144, 500, 244 A; 415/119
See application file for complete search history.

(56) References Cited

U.S. PATENT DOCUMENTS

| | | | |
|---|---|---|---|
| 3,861,828 | A | 1/1975 | Biermann et al. |
| 4,210,401 | A | 7/1980 | Batten |
| 4,369,149 | A | 1/1983 | Violett |
| 4,650,402 | A | 3/1987 | Jones, Jr. et al. |

(Continued)

FOREIGN PATENT DOCUMENTS

| | | |
|---|---|---|
| EP | 0299184 | 1/1989 |
| EP | 0405796 | 1/1991 |

(Continued)

*Primary Examiner* — Edward Look
*Assistant Examiner* — Jason Mikus
(74) *Attorney, Agent, or Firm* — General Electric Company; William Scott Andes (57) ABSTRACT

Dampers for fan spinners of aircraft engines are disclosed. An example fan module for a gas turbine engine may include a fan disk; fan blades mounted to the fan disk and extending radially therefrom; a fan spinner operatively coupled to the fan disk at an axially upstream position; and/or one or more elastic vibration dampers operatively interposing the fan spinner and the fan disk. The elastic vibration dampers may be disposed circumferentially around an interface between the fan spinner and the fan disk and may be compressed axially and/or radially.

17 Claims, 6 Drawing Sheets

(56) References Cited

U.S. PATENT DOCUMENTS

| | | | |
|---|---|---|---|
| 4,685,289 A | 8/1987 | Violett et al. |
| 4,819,894 A | 4/1989 | Sternberger |
| 4,826,108 A | 5/1989 | Briscoe et al. |
| 4,836,474 A | 6/1989 | Briscoe et al. |
| 4,909,346 A | 3/1990 | Torkelson |
| 5,078,638 A | 1/1992 | Molina |
| 5,102,302 A | 4/1992 | Schilling et al. |
| 5,165,856 A | 11/1992 | Schilling et al. |
| 5,199,850 A | 4/1993 | Carvalho et al. |
| 5,275,531 A | 1/1994 | Roberts |
| 5,301,900 A | 4/1994 | Groen et al. |
| 5,354,176 A | 10/1994 | Schilling et al. |
| 5,356,264 A | 10/1994 | Watson et al. |
| 5,479,060 A | 12/1995 | Giamati et al. |
| 5,544,844 A | 8/1996 | Groen et al. |
| 5,573,378 A | 11/1996 | Barcza |
| 5,634,800 A | 6/1997 | Giamati |
| 5,709,532 A | 1/1998 | Giamati et al. |
| 5,767,605 A | 6/1998 | Giamati |
| 5,810,284 A | 9/1998 | Hibbs et al. |
| 5,833,435 A | 11/1998 | Smith |
| 5,901,586 A | 5/1999 | Hale |
| 5,915,694 A | 6/1999 | Brum |
| 6,013,361 A | 1/2000 | Seal et al. |
| 6,070,543 A | 6/2000 | A'Lateef |
| 6,077,040 A | 6/2000 | Pruden et al. |
| 6,447,255 B1 | 9/2002 | Bagnall et al. |
| 6,520,742 B1 * | 2/2003 | Forrester et al. | 416/220 R |
| 6,521,296 B1 | 2/2003 | Seal et al. |
| 6,561,763 B2 | 5/2003 | Breakwell |
| 6,641,893 B1 | 11/2003 | Suresh et al. |
| 6,942,462 B2 | 9/2005 | Breakwell et al. |
| 6,974,105 B2 | 12/2005 | Pham |
| 7,182,290 B2 | 2/2007 | Sliwa et al. |
| 7,305,842 B1 | 12/2007 | Schiff |
| 7,308,869 B2 | 12/2007 | Stone |
| 7,523,603 B2 | 4/2009 | Hagen et al. |
| 7,762,057 B2 | 7/2010 | Sloan et al. |
| 7,857,578 B2 | 12/2010 | Urac et al. |
| 7,963,094 B1 | 6/2011 | Cupolo |
| 2004/0219079 A1 | 11/2004 | Hagen et al. |
| 2005/0045762 A1 | 3/2005 | Pham |
| 2005/0093507 A1 | 5/2005 | Sliwa et al. |
| 2005/0139363 A1 | 6/2005 | Thomas |
| 2007/0020089 A1 * | 1/2007 | Forgue et al. | 415/119 |
| 2007/0068467 A1 | 3/2007 | Stone |
| 2008/0213490 A1 | 9/2008 | Strange et al. |
| 2008/0302083 A1 | 12/2008 | Sloan et al. |
| 2009/0014609 A1 | 1/2009 | Urac et al. |
| 2009/0175718 A1 | 7/2009 | Diaz et al. |
| 2009/0180939 A1 | 7/2009 | Hagen et al. |
| 2009/0214344 A1 | 8/2009 | Ferrier |
| 2009/0278021 A1 | 11/2009 | Jimeno De La Torre |
| 2010/0060730 A1 | 3/2010 | Poussin et al. |
| 2010/0288877 A1 | 11/2010 | Strabala |
| 2011/0036938 A1 | 2/2011 | Blomeley |
| 2011/0150657 A1 * | 6/2011 | Millier et al. | 416/219 R |
| 2011/0167785 A1 | 7/2011 | Moore et al. |
| 2011/0167786 A1 | 7/2011 | Marques et al. |

FOREIGN PATENT DOCUMENTS

| | | |
|---|---|---|
| EP | 0622526 | 11/1994 |
| EP | 0405796 | 2/1995 |
| EP | 0622526 | 9/1997 |
| EP | 0631553 | 11/1997 |
| EP | 0825109 | 2/1998 |
| EP | 1227036 | 7/2002 |
| EP | 1016588 | 4/2006 |
| EP | 1073583 | 8/2007 |
| EP | 2096271 | 9/2009 |
| EP | 2287074 | 2/2011 |
| WO | 9303258 | 2/1993 |
| WO | 9318966 | 9/1993 |
| WO | 9628343 | 9/1996 |
| WO | 9718081 | 5/1997 |
| WO | 9956912 | 11/1999 |
| WO | 2004064990 | 8/2004 |
| WO | 2005026654 | 3/2005 |
| WO | 2005042342 | 5/2005 |
| WO | 2007038674 | 4/2007 |
| WO | 2009009864 | 1/2009 |

* cited by examiner

FIG. 6

DAMPERS FOR FAN SPINNERS OF AIRCRAFT ENGINES

CROSS REFERENCE TO RELATED APPLICATION

This application claims the benefit of U.S. Provisional Application No. 61/637,537, filed Apr. 24, 2012, which is incorporated by reference in its entirety.

BACKGROUND

The subject matter disclosed herein relates generally to turbofan engines and, more particularly, to dampers for fan spinners of fan modules of turbofan engines for aircraft.

Some turbofan engines may include a fan spinner disposed upstream of a fan disk. The fan spinner may be mounted to the fan disk by a fan spinner support.

The problem: In some configurations, relative vibratory motion between the fan spinner and the fan disk may contribute to vibration-induced, high-cycle fatigue cracking of the fan spinner support.

BRIEF DESCRIPTION OF THE INVENTION

Solutions for the above-mentioned problem are provided by example embodiments of the present disclosure.

Some example gas turbine engines according to at least some aspects of the present disclosure may include a fan spinner; a fan disk; and/or an elastic vibration damper disposed within an interior of the fan spinner and/or operatively interposing the fan spinner and the fan disk. The elastic vibration damper may contact the fan spinner forward of an aft edge of the fan spinner.

Some example fan modules for gas turbine engines according to at least some aspects of the present disclosure may include a fan disk; a plurality of fan blades mounted to the fan disk and extending radially therefrom; a fan spinner operatively coupled to the fan disk at an axially upstream position; and/or one or more elastic vibration dampers operatively interposing the fan spinner and the fan disk. The one or more elastic vibration dampers may be disposed circumferentially around an interface between the fan spinner and the fan disk forward of an aft edge of the fan spinner and/or within an interior of the fan spinner.

Some example methods of assembling a fan module according to at least some aspects of the present disclosure may include coupling a fan spinner to a fan disk using at least one fastener; and/or compressing at least one elastic vibration damper operatively disposed between the fan spinner and the fan disk forward of an aft edge of the fan spinner and/or within an interior of the fan spinner by tightening at least one fastener.

The foregoing brief description is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Example embodiments are described herein with reference to the drawings, in which.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, turbofan engines and, more particularly, dampers for fan spinners of fan modules of turbofan engines for aircraft.

Figure 1:
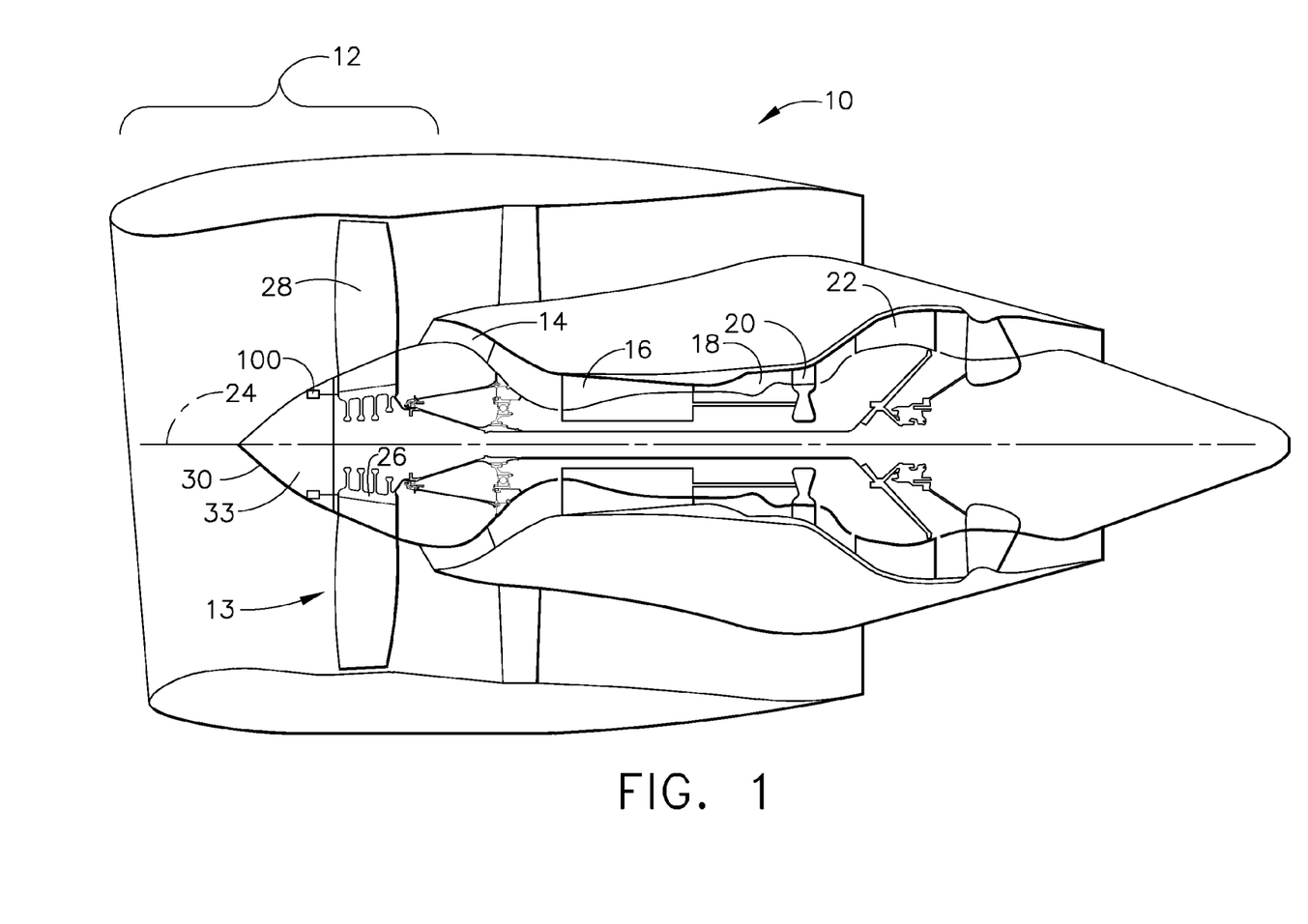
FIG. 1 is a cross section view of an example gas turbine engine.

FIG. 1 is a cross section view of an example gas turbine engine (GTE) 10, according to at least some aspects of the present disclosure. GTE 10 may include, in a serial flow relationship from forward to aft, a fan module 12 comprising a fan 13, a low pressure compressor 14, a high pressure compressor 16, a combustor 18, a high pressure turbine 20, and/or a low pressure turbine 22, all of which may be disposed about an engine axis 24. As used herein with reference to GTE 10 and/or various components thereof, "axial" and/or "radial" may generally be understood with reference to engine axis 24. Generally, fan 13 and/or low pressure compressor 14 may be driven by low pressure turbine 22 and/or high pressure compressor 16 may be driven by high pressure turbine 20.

In some example embodiments according to at least some aspects of the present disclosure, fan module 12 may comprise a fan disk 26 to which one or more fan blades 28 may be mounted. A fan spinner 30, which may be generally conical, may be releasably mounted to fan disk 26. One or more elastic vibration dampers 100 may operatively interpose fan spinner 30 and fan disk 26. Generally, elastic vibration dampers 100 may be comprised of composite and/or rubber materials.

Figure 2:
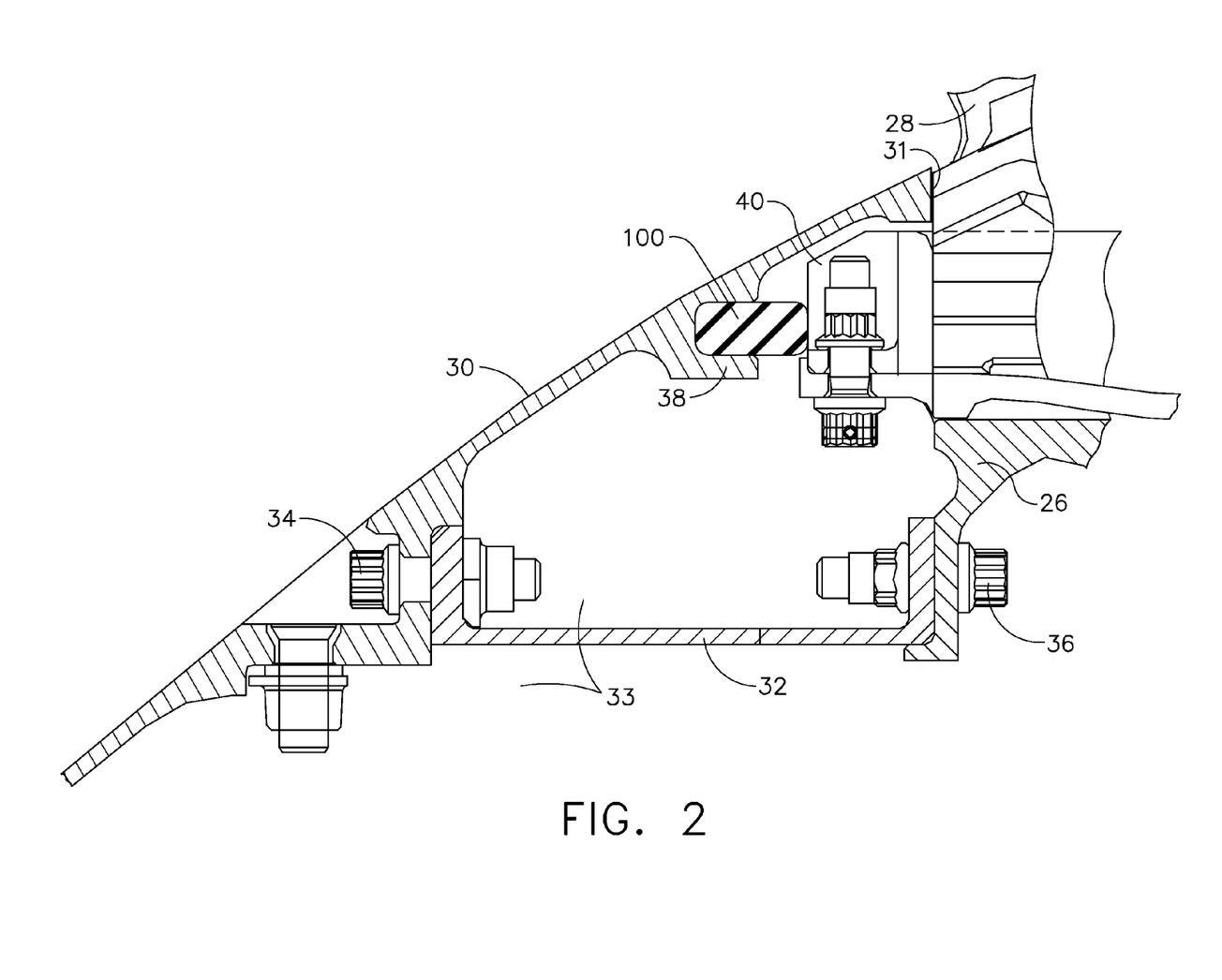
FIG. 2 is a detailed cross section view of an example interface between a fan disk and a fan spinner including an elastic vibration damper.

FIG. 2 is a detailed cross section view of an example interface between fan disk 26 and fan spinner 30 including elastic vibration damper 100, according to at least some aspects of the present disclosure. FIG. 2 illustrates an example embodiment in which elastic vibration damper 100 is squeezed generally axially between fan spinner 30 and fan disk 26. Fan spinner 30 may be mounted to fan disk 26 by a fan spinner support 32. For example, fan spinner support 32 may extend generally axially between fan disk 26 and fan spinner 30, generally axially within an interior 33 of fan spinner 30. Fan spinner support 32 may be coupled to fan disk 26 and/or fan spinner 30 by one or more fasteners, such as bolt 34 and/or bolt 36. Fan spinner support 32 may provide a substantially rigid connection between fan spinner 30 and fan disk 26. In some example embodiments, elastic vibration damper 100 may contact fan spinner 30 forward of an aft edge 31 of fan spinner 30. In some example embodiments, elastic vibration damper 100 may be disposed within interior 33 of fan spinner 30.

In some example embodiments according to as least some aspects of the present disclosure, elastic vibration damper 100 may be operatively disposed between fan disk 26 and fan spinner 30 at a position generally radially outward from fan spinner support 32. For example, elastic vibration damper 100 may be disposed on a generally circumferential ring 38 on a radially internal surface of fan spinner 30. Elastic vibration damper 100 may extend generally axially aft from ring 38 and/or may contact fan disk 26, such as a generally forwardly extending projection, such as disk post 40. Elastic vibration damper 100 may be at least partially compressed between ring 38 and disk post 40. As a result, elastic vibration damper 100 may operate to oppose relative displacement of fan spinner 30 towards fan disk 26.

Figure 3:
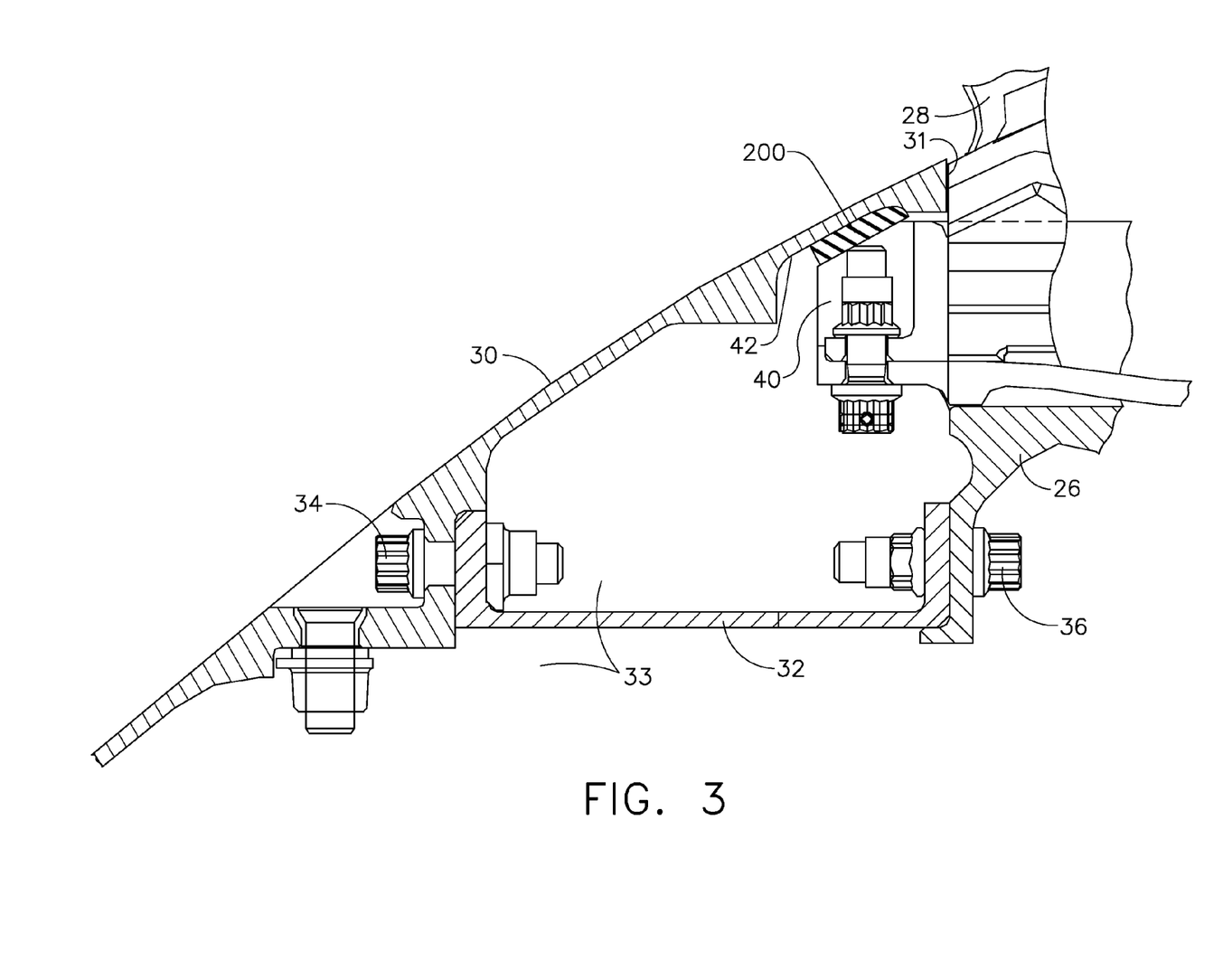
FIG. 3 is a detailed cross section view of an alternative example interface between a fan disk and a fan spinner including an elastic vibration damper.

FIG. 3 is a detailed cross section view of an example interface between fan disk 26 and fan spinner 30 including elastic vibration damper 200, according to at least some aspects of the present disclosure. FIG. 3 illustrates an example embodiment in which elastic vibration damper 200 is squeezed generally radially between fan spinner 30 and fan disk 26. Generally similar to the example embodiment described above with reference to FIG. 2, fan spinner 30 may be mounted to fan disk 26 by fan spinner support 32. For example, fan spinner support 32 may extend generally axially between fan disk 26 and fan spinner 30, generally axially within fan spinner 30. Fan spinner support 32 may be coupled to fan disk 26 and/or fan spinner 30 by one or more fasteners, such as bolt 34 and/or bolt 36. Fan spinner support 32 may provide a substantially rigid connection between fan spinner 30 and fan disk 26. Elastic vibration damper 200 may be disposed circumferentially around an interface between fan spinner 30 and fan disk 26 forward of aft edge 31 of fan spinner 30 and/or within interior 33 of fan spinner 30.

In some example embodiments according to as least some aspects of the present disclosure, elastic vibration damper 200 may be operatively disposed between fan disk 26 and fan spinner 30 at a position generally radially outward from fan spinner support 32. For example, elastic vibration damper 200 may be disposed on an internal face 42 of fan spinner 30. Elastic vibration damper 200 may extend generally radially inward from internal face 42 and/or may fan disk 26, such as a generally forwardly extending projection, such as disk post 40. Elastic vibration damper 200 may be at least partially compressed between internal face 42 and disk post 40. As a result, elastic vibration damper 200 may operate to oppose relative displacement of fan spinner 30 towards fan disk 26.

Figure 4:
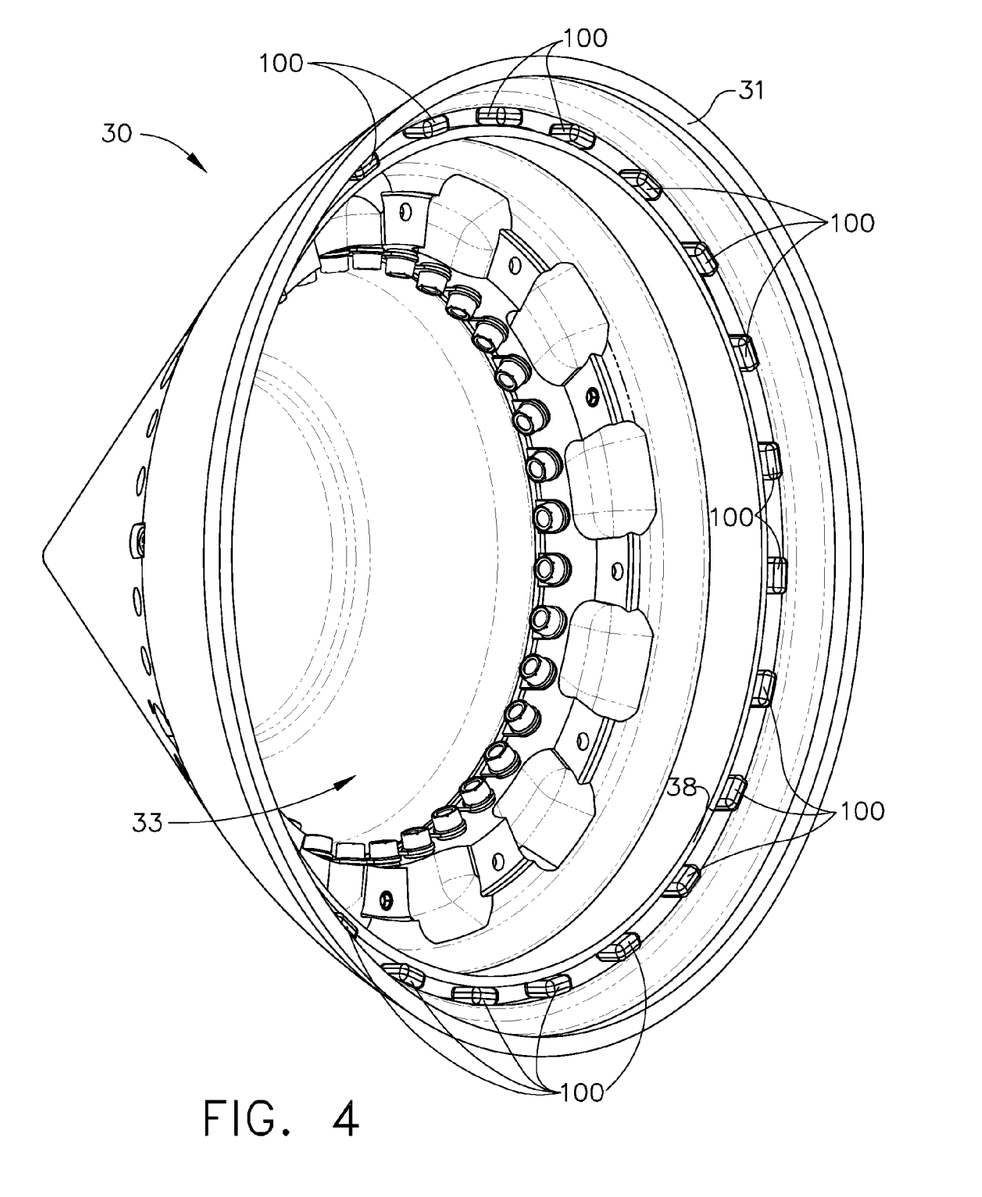
FIG. 4 is a perspective view of an example fan spinner including a plurality of elastic vibration dampers.

FIG. 4 is a perspective view of example fan spinner 30 including a plurality of elastic vibration dampers 100, according to at least some aspects of the present disclosure. The plurality of elastic vibration dampers 100 may be disposed circumferentially around fan spinner 30, such that they operatively interpose fan spinner 30 and fan disk 26 when fan module 12 is assembled. When fan module 12 is assembled, elastic vibration dampers 100 may be disposed generally circumferentially around the interface between fan spinner 30 and fan disk 26. Some example embodiments may include about 24 elastic vibration dampers 100. More or fewer dampers may be used.

Figure 5:
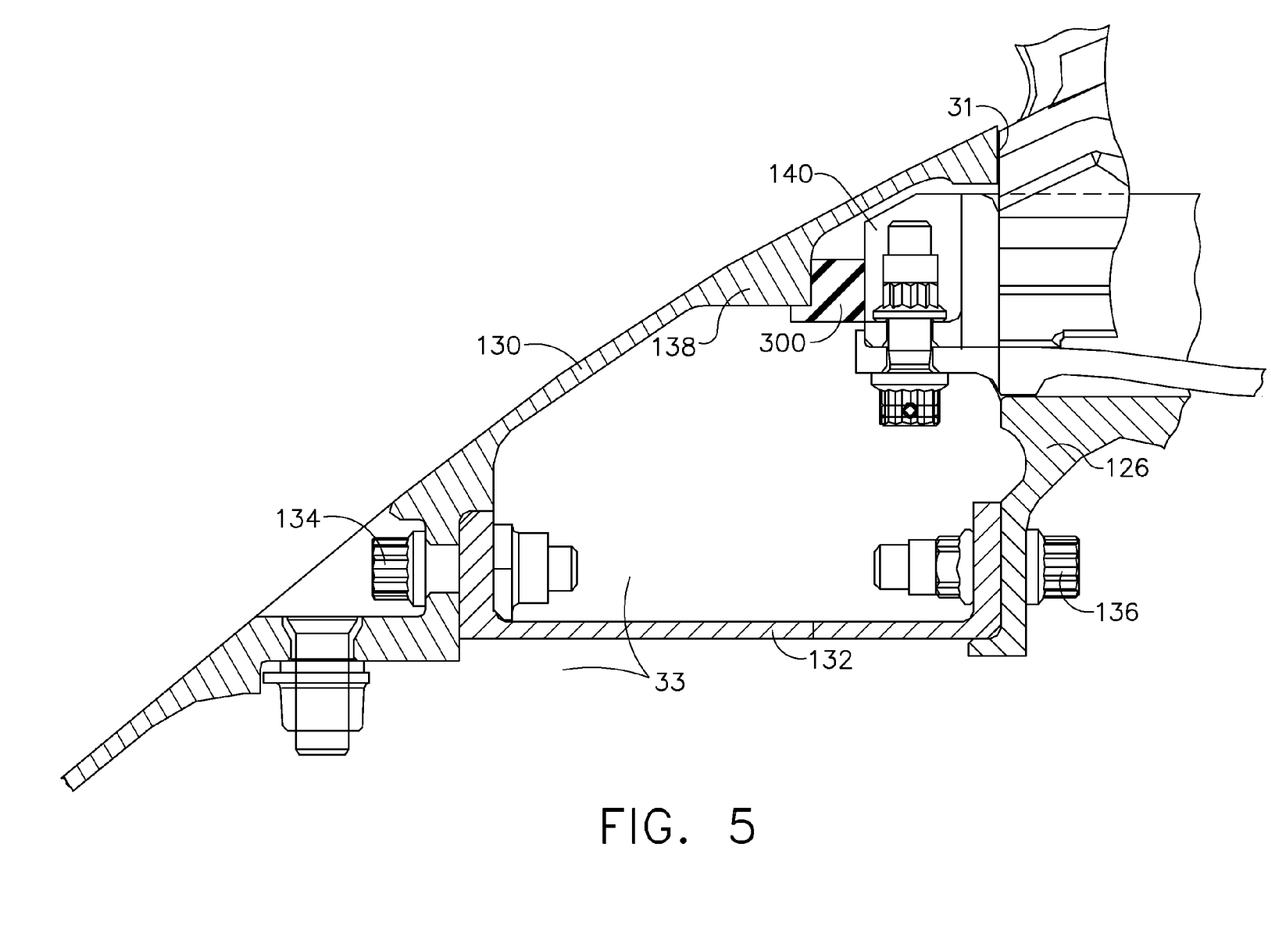
FIG. 5 is a detailed cross section view of an alternative example interface between a fan disk and a fan spinner including a full ring elastic vibration damper.

FIG. 5 is a detailed cross section view of an alternative example interface between a fan disk 126 and a fan spinner 130 including a full ring elastic vibration damper 300, according to at least some aspects of the present disclosure. FIG. 5 illustrates an example embodiment in which elastic vibration damper 300 is squeezed generally axially between fan spinner 130 and fan disk 126. Fan spinner 130 may be mounted to fan disk 126 by a fan spinner support 132. For example, fan spinner support 132 may extend generally axially between fan disk 126 and fan spinner 130, generally axially within an interior 133 of fan spinner 130. Fan spinner support 132 may be coupled to fan disk 126 and/or fan spinner 130 by one or more fasteners, such as bolt 134 and/or bolt 136. Fan spinner support 132 may provide a substantially rigid connection between fan spinner 130 and fan disk 126. In some example embodiments, elastic vibration damper 300 may contact fan spinner 130 forward of an aft edge 131 of fan spinner 130.

In some example embodiments according to as least some aspects of the present disclosure, elastic vibration damper 300 may be operatively disposed between fan disk 126 and fan spinner 130 at a position generally radially outward from fan spinner support 132. For example, elastic vibration damper 300 may be disposed on a generally circumferential ring 138 on a radially internal surface of fan spinner 130. Elastic vibration damper 300 may extend generally axially aft from ring 138 and/or may contact fan disk 126, such as a generally forwardly extending projection, such as disk post 140. Elastic vibration damper 300 may be at least partially compressed between ring 138 and disk post 40. As a result, elastic vibration damper 300 may operate to oppose relative displacement of fan spinner 130 towards fan disk 126.

Figure 6:
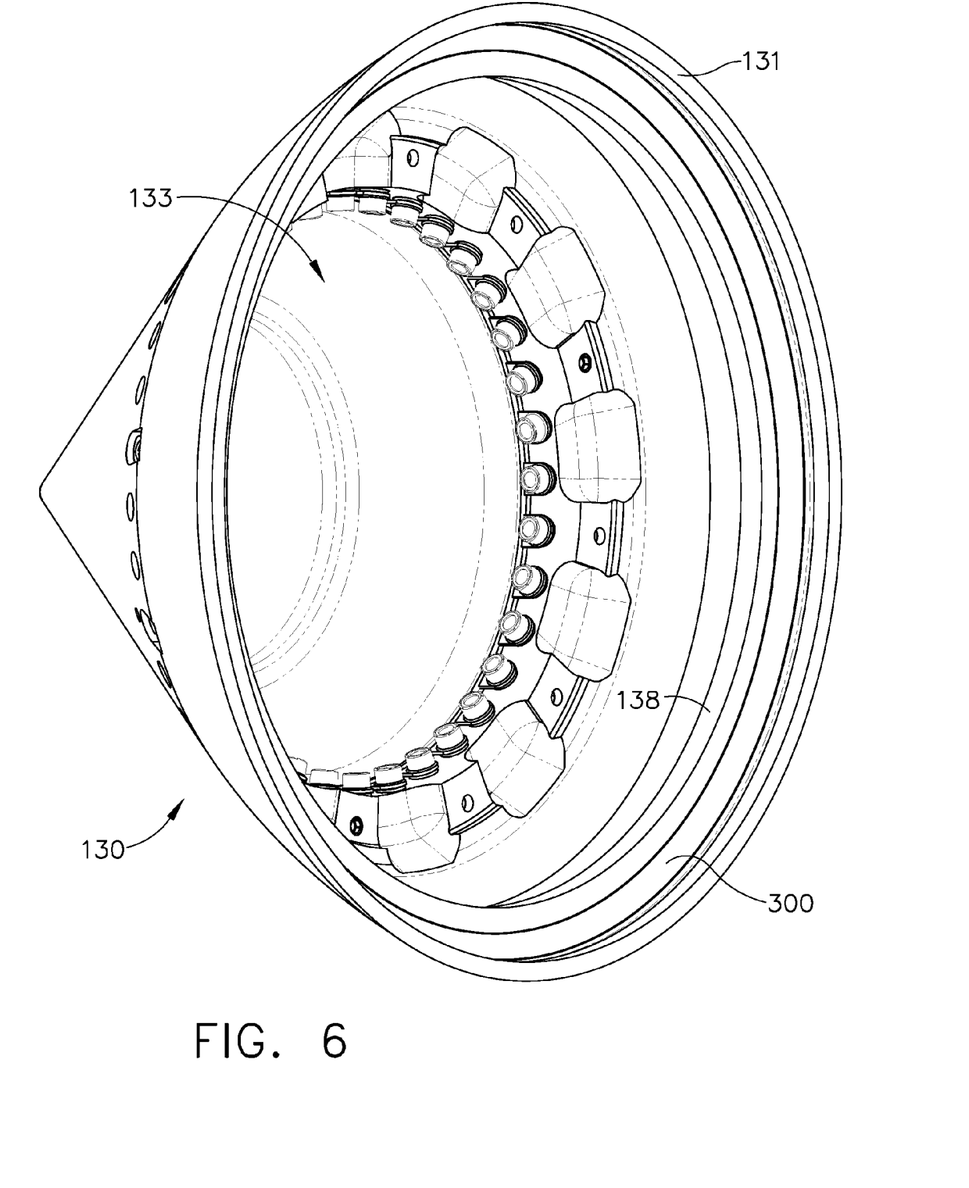
FIG. 6 is a perspective view of an example fan spinner including a full ring elastic vibration damper, all in accordance with at least some aspects of the present disclosure.

FIG. 6 is a perspective view of an example fan spinner including a full ring elastic vibration damper 300, according to at least some aspects of the present disclosure. Elastic vibration damper 300 may comprise a substantially full ring circumferentially disposed against fan spinner 130, such that elastic vibration damper 300 operatively interposes fan spinner 130 and fan disk 126 when the fan module is assembled. As used herein, "full ring" may refer to a ring that is substantially continuous, which may or may not include one or more breaks or discontinuities comprising a small fraction of its total circumference.

It is within the scope of the disclosure to use a full ring elastic vibration damper (e.g., FIG. 6) arranged for generally radial compression between the fan spinner and the fan disk (e.g., FIG. 3).

In some example embodiments according to at least some aspects of the present disclosure, various materials (e.g., composite and/or rubber or rubber-like) materials providing desirable characteristics may be used to construct elastic vibration dampers 100, 200, 300. For example, elastic vibration dampers 100, 200, 300 may comprise one or more of the following: fluorosilicone rubber (FVMQ) (e.g., having a durometer of about 70), silicone rubber (VMQ), fluorocarbon rubber (FKM), perfluorinated elastomer (FFKM), tetrafluoroethylene/propylene rubber (FEPM), ethylene propylene diene rubber (EPDM), nitrile rubber (NBR and/or HNBR), and/or butyl rubber (IIR), as well as fiber and/or particulate reinforced compositions of such materials.

In some example embodiments according to at least some aspects of the present disclosure, composite/rubber elastic vibration dampers 100, 200, 300 may limit vibration at most engine speeds. For example, elastic vibration dampers 100, 200, 300 may reduce and/or limit relative displacement between fan spinner 30, 130 and fan disk 26, 126, thus reducing the risk of failure of fan spinner support 32, 132. Some example embodiments may reduce or prevent high cycle fatigue cracking (e.g., vibration induced) of spinner support 32, 132, which may result in high engine vibration levels.

Generally, some example embodiments according to at least some aspects of the present disclosure may eliminate a failure mode and/or may improve service life of gas turbine engine 10 and/or fan module 12.

An example method of assembling a fan module according to at least some aspects of the present disclosure may include one or more of the following operations: coupling fan spinner 30, 130 to fan disk 26, 126 using at least one fastener (e.g., bolt 34, 134); and compressing at least one elastic vibration damper 100, 200, 300 operatively disposed between fan spinner 30, 130 and fan disk 26, 126 forward of an aft edge 31, 131 of fan spinner 30, 130 and/or within an interior 33, 133 of fan spinner 30, 130 by tightening the at least one fastener (e.g., bolt 34, 134). For example, elastic vibration damper 100, 200, 300 may be compressed at least about 5% during assembly.

Some example methods according to at least some aspects of the present disclosure may include, prior to coupling fan spinner 30, 130 to fan disk 26, 126, placing the at least one elastic vibration damper 100, 200, 300 between fan spinner 30, 130 and fan disk 26, 126. Some example methods may include placing a plurality of the elastic vibration dampers 100, 200, 300 circumferentially around an interface between fan spinner 30, 130 and fan disk 26, 126. Some example methods may include disposing the plurality of elastic vibration dampers 100, 200, 300 on fan spinner 30, 130 and disposing fan spinner 30, 130 on fan disk 26, 126.

Some example methods according to at least some aspects of the present disclosure may include compressing the at least one elastic vibration damper 100, 300 in a generally axial direction. Some example methods according to at least some aspects of the present disclosure may include compressing the at least on elastic vibration damper 200 in a generally radial direction.

Some example methods may include, prior to coupling fan spinner 30, 130 to fan disk 26, 126, mounting at least one fan blade 28 to fan disk 26, 126.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
 a fan spinner;
 a fan disk; and
 an elastic vibration damper disposed within an interior of the fan spinner and operatively interposing the fan spinner and the fan disk;
 wherein the elastic vibration damper contacts the fan spinner forward of an aft edge of the fan spinner and is squeezed generally radially between the fan spinner and the fan disk.

2. The gas turbine engine of claim 1, wherein the elastic vibration damper is squeezed generally axially between the fan spinner and the fan disk.

3. The gas turbine engine of claim 1, further comprising a plurality of the elastic vibration dampers disposed circumferentially around an interface between the fan spinner and the fan disk.

4. The gas turbine engine of claim 1, wherein the elastic vibration damper comprises fluorosilicone rubber.

5. The gas turbine engine of claim 1, wherein the elastic vibration damper comprises one or more of silicone rubber, fluorocarbon rubber, perfluorinated elastomer, tetrafluoroethylene/propylene rubber, ethylene propylene diene rubber, nitrile rubber, or butyl rubber.

6. The gas turbine engine of claim 1, wherein the elastic vibration damper comprises one or more of a fiber or a particulate reinforcement.

7. A fan module for a gas turbine engine, the fan module comprising:
 a fan disk;
 a plurality of fan blades mounted to the fan disk and extending radially therefrom;
 a fan spinner operatively coupled to the fan disk at an axially upstream position; and
 one or more elastic vibration dampers operatively interposing the fan spinner and the fan disk, the one or more elastic vibration dampers being disposed circumferentially around an interface between the fan spinner and the fan disk forward of an aft edge of the fan spinner and within an interior of the fan spinner;
 wherein the one or more elastic vibration dampers are squeezed generally radially between the fan spinner and the fan disk.

8. The fan module of claim 7, wherein the one or more elastic vibration dampers are squeezed generally axially between the fan spinner and the fan disk.

9. The fan module of claim 7, wherein the one or more elastic vibration dampers comprises 24 elastic vibration dampers.

10. The fan module of claim 7, wherein the one or more elastic vibration dampers comprises a substantially full ring elastic vibration damper.

11. The fan module of claim 7, wherein the one or more elastic vibration dampers are arranged to oppose relative displacement of the fan spinner towards the fan disk.

12. The fan module of claim 7,
 further comprising a fan spinner support substantially rigidly coupling the fan spinner to the fan disk;
 wherein the fan spinner support is disposed radially inward from the one or more elastic vibration dampers.

13. A method of assembling a fan module, the method comprising:
 coupling a fan spinner to a fan disk using at least one fastener; and
 partially compressing at least one elastic vibration damper operatively disposed between the fan spinner and the fan disk forward of an aft edge of the fan spinner and within an interior of the fan spinner by tightening the at least one fastener;
 wherein partially compressing the at least one elastic vibration damper comprises compressing the at least on elastic vibration damper in a generally radial direction.

14. The method of claim 13, further comprising, prior to coupling the fan spinner to the fan disk, placing the at least one elastic vibration damper between the fan spinner and the fan disk.

15. The method of claim 14, wherein placing the at least one elastic vibration damper between the fan spinner and the fan disk comprises placing a plurality of the elastic vibration dampers circumferentially around an interface between the fan spinner and the fan disk.

16. The method of claim 15, wherein placing the plurality of the elastic vibration dampers circumferentially around an interface between the fan spinner and the fan disk comprises disposing the plurality of elastic vibration dampers on the fan spinner and disposing the fan spinner on the fan disk.

17. The method of claim 13, wherein partially compressing the at least one elastic vibration damper comprises compressing the at least one elastic vibration damper in a generally axial direction.

\* \* \* \* \*

UNITED STATES PATENT AND TRADEMARK OFFICE
CERTIFICATE OF CORRECTION

| | |
|---|---|
| PATENT NO. | : 9,261,112 B2 |
| APPLICATION NO. | : 13/688558 |
| DATED | : February 16, 2016 |
| INVENTOR(S) | : Stoughton et al. |

It is certified that error appears in the above-identified patent and that said Letters Patent is hereby corrected as shown below:

Specification

In Column 3, Line 8, delete "to as least" and insert -- to at least --, therefor.

In Column 3, Line 41, delete "to as least" and insert -- to at least --, therefor.

In Column 4, Line 16, delete "to as least" and insert -- to at least --, therefor.

In Column 5, Line 32, delete "at least on" and insert -- at least one --, therefor.

Claims

In Column 6, Line 54, in Claim 13, delete "at least on" and insert -- at least one --, therefor.

Signed and Sealed this
Twenty-eighth Day of June, 2016

Michelle K. Lee
*Director of the United States Patent and Trademark Office*